Sept. 12, 1967  E. L. TAYLOR ETAL  3,340,728
FUEL PUMP TESTER
Filed Nov. 2, 1964
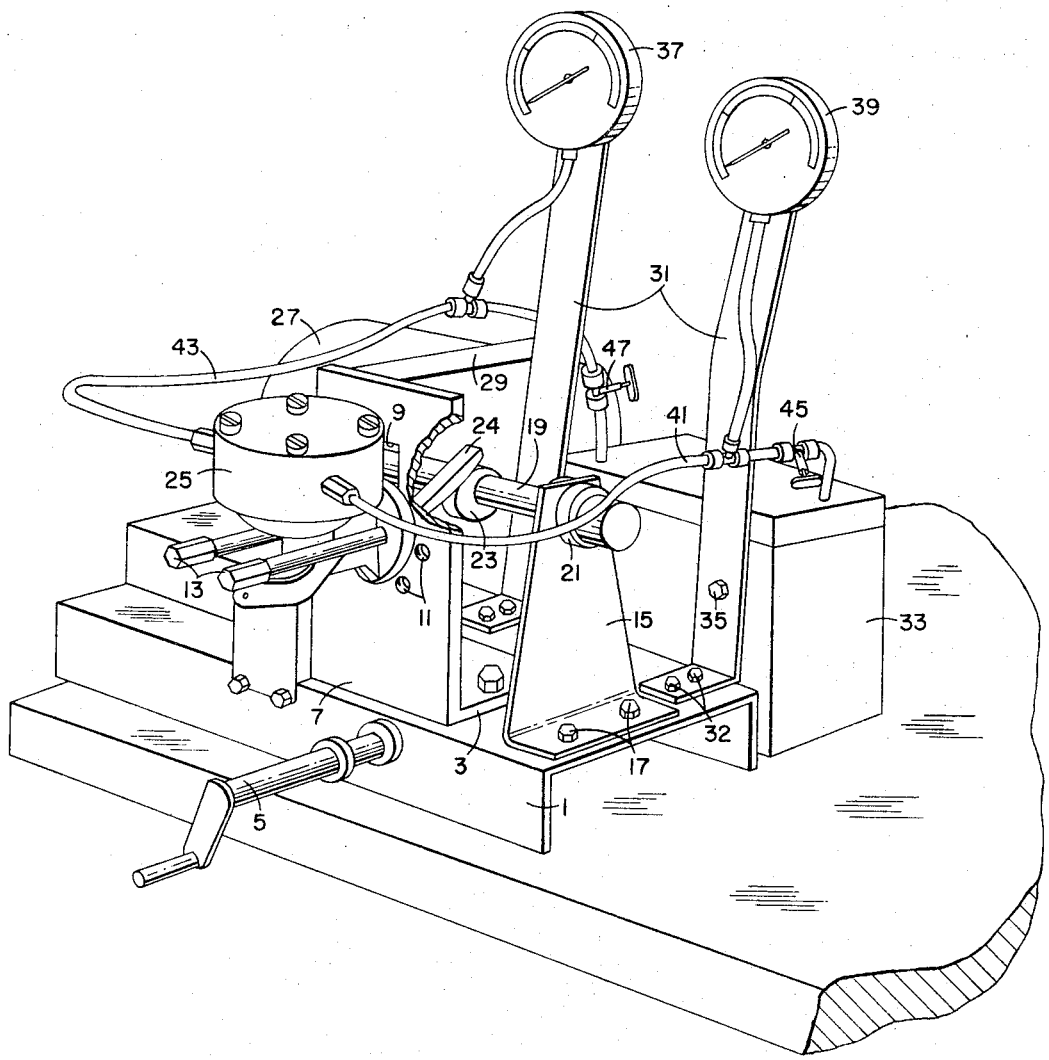
Manuel M. Chacon, Sr.
Edward L. Taylor, deceased,
  by Winnie M. Taylor, Administratrix,
        INVENTORS.
BY  Harry M. Saragovitz
    Edward J. Kelly
    Herbert Berl
    James T. Deaton
        ATTORNEYS 3,340,728
FUEL PUMP TESTER
Edward L. Taylor, deceased, late of Burnet, Tex., by Winnie M. Taylor, administratrix, c/o Joe Taylor, Rte. 2, Box 103-A, Burnet, Tex. 78611, and Manuel M. Chacon, Sr., 915 S. Espina, Las Cruces, N. Mex. 88001
Filed Nov. 2, 1964, Ser. No. 409,052
1 Claim. (Cl. 73—118)

ABSTRACT OF THE DISCLOSURE

A fuel pump tester having an adjustable carriage adapted for mounting a fuel pump thereon, a cam driven by a variable speed motor mounted for coaction with the fuel pump and gauges for measuring the input and output pressures of the fuel pump.

The invention described herein may be manufactured and used by or for the Government for governmental purposes without the payment of any royalty thereon.

This invention relates to fuel pump test apparatus for testing the operability of automotive fuel pumps.

In the past, fuel pumps have been tested by visual inspection and manipulation of the pump arm by hand. This procedure for testing fuel pumps is neither proper nor practical since it does not give a positive indication of the operability of the fuel pump. Therefore, a mechanical test apparatus is needed whereby fuel pumps may be tested to determine the operability thereof whether new or used.

Therefore, it is an object of this invention to provide a fuel pump test apparatus for testing the operability of fuel pumps, thereby eliminating the cost of rebuilding serviceable units thought to be defective.

Another object of this invention is to provide a fuel pump test apparatus that is adjustable so that different makes and sizes of fuel pumps can be tested on the same test apparatus.

A further object of this invention is to provide a fuel pump test apparatus that will accurately indicate the amount of vacuum on the suction side of the pump and the amount of pressure on the delivery side of the pump.

Yet another object of this invention is to provide a simple and compact test unit.

In accordance with this invention, a new fuel pump test apparatus is provided in which an adjustable carriage with fasteners thereon is mounted adjacent a rotary cam actuator for actuating the arm of a fuel pump when mounted on said carriage. A fuel supply unit, including test gauges, is disposed for connection to the fuel pump to be tested. When in operation, the test gauges indicate the vacuum and pressure produced by the pump and therefore the operability of the pump being tested.

This invention may be better understood by referring to the drawing forming part of this specification, and in which like numerals are employed to designate corresponding parts throughout the same, and wherein:

The single figure of the drawing is a plan view, with portions cut away and in sections, of the fuel pump tester.

In the drawings, wherein for the purpose of illustration is shown a preferred embodiment of our invention, numeral 1 designates a support frame. A carriage 3 is adjustably mounted on support frame 1 by a conventional carriage screw device (not shown), and the screw device is adjusted by hand crank 5. Carriage 3 has an upstanding plate 7 which has an opening 9 and screw threaded bores 11. Plate 7 is provided with the plurality of bores 11 so that different size fuel pumps may be clamped to plate 7 by bolts 13. Alternatively, a separate plate or plates may be provided in place of the plurality of bores for fastening different size fuel pumps to plate 7.

A pair of cam shaft arms 15 (only one of which is visible in the figure) are mounted on support frame 1 by bolts 17. A cam shaft 19 is rotatably mounted by means of bearings 21 mounted in cam shaft arms 15. A cam 23 on cam shaft 19 is adapted to actuate arm 24 of a fuel pump 25 when the pump is mounted on plate 7. One end of cam shaft 19 is drivingly connected to a variable speed electric motor 27 by means of a conventional drive mechanism located within housing 29.

A pair of supports 31 are secured by bolts 32 on support frame 1, and a fuel tank 33 is connected to supports 31 by bolts 35. A pressure gauge 37 is mounted on one of said supports 31, and a vacuum gauge 39 is mounted on the other of said supports 31. A fuel supply line 41 connects fuel tank 33 with the vacuum side of fuel pump 25, and a fuel return line 43 connects the pressure side of fuel pump 25 to the fuel tank 33. Vacuum gauge 39 is connected in fluid communication with supply line 41, and pressure gauge 37 is connected in fluid communication with return line 43. Valves 45 and 47 are mounted in supply line 41 and return line 43 respectively to adjust the fuel supply to and from the fuel pump 25 as desired.

In operation, a fuel pump desired to be tested, such as fuel pump 25, is mounted on plate 7 by bolts 13. Plate 7 is then adjusted toward or away from cam 23 by hand crank 5 to properly position arm 24 of the fuel pump with respect to cam 23. When supply and return lines 41 and 43 are connected to fuel pump 25, motor 27 is turned on to drive the cam shaft at the desired speed, and pressure and vacuum gauges 37 and 39 are read to determine the condition and operability of the fuel pump being tested.

Since plate 7 is adjustable relative to cam 23 and the speed of electric motor 27 may be varied, the fuel pump tester described herein simulates the fuel pump mounting and driving system as it exists on an automotive engine.

It is also pointed out that pressure and vacuum gauges 37 and 39 can be used to check the vacuum assist side of a dual fuel-vacuum pump as is commonly used on many engines today.

It is to be understood that the form of our invention, herewith shown and described, is to be taken as a preferred example of the same, and that various changes in the shape, size and arrangement of parts may be resorted to, without departing from the spirit of our invention, or the scope of the subjoined claim.

We claim:

A test unit comprising: a support frame; a carriage adjustably mounted by rotary handle operating means on said support frame, said carriage adapted to have a fuel pump mounted thereon; a cam shaft rotatably mounted on said support frame and having a cam thereon, said cam shaft being mounted relative to said carriage so that said cam is adapted to cooperate with a fuel pump arm when a fuel pump is mounted on said carriage; a variable speed electric motor, said motor being mounted on said support frame and drivingly connected to said cam shaft; fuel means adapted to be connected to said fuel pump so as to supply fuel to said fuel pump and to discharge fuel from said fuel pump; and test gauge means including a vacuum gauge in communication with the fuel supply to the fuel pump and a pressure gauge in communication with the discharge fuel from said fuel pump.

References Cited

UNITED STATES PATENTS

| | | | |
|---|---|---|---|
| 2,145,401 | 1/1939 | MacBride | 73—118 |
| 2,611,265 | 9/1952 | Latourelle | 73—118 |
| 2,720,782 | 10/1955 | Stein | 73—118 |
| 2,730,897 | 1/1956 | Morse | 73—118 |

JAMES J. GILL, *Acting Primary Examiner.*

RICHARD C. QUEISSER, *Examiner.*

J. W. MYRACLE, *Assistant Examiner.*